United States Patent [19]

Bauerschmidt et al.

[11] 3,928,331
[45] Dec. 23, 1975

[54] PROCESS FOR THE MANUFACTURE OF 7-AMINO-3-CEPHEM-4-CARBOXYLIC ACID DERIVATIVES

[75] Inventors: Eberhard Bauerschmidt, Konigstein, Taunus; Dieter Bormann, Kelkheim, Taunus; Manfred Worm, Mainz-Kastel, all of Germany

[73] Assignee: Hoechst Aktiengesellschaft, Frankfurt am Main, Germany

[22] Filed: Aug. 30, 1973

[21] Appl. No.: 392,877

[30] Foreign Application Priority Data

Sept. 2, 1972  Germany.............................. 2243242

[52] U.S. Cl.............................. 260/243 C; 424/246
[51] Int. Cl.².......................................... C07D 501/18
[58] Field of Search................................. 260/243 C

[56]         References Cited
           UNITED STATES PATENTS

| | | | |
|---|---|---|---|
| 2,659,747 | 11/1953 | Young................... | 260/461 |
| 3,249,622 | 5/1966 | Herrling et al................... | 260/306.7 |
| 3,499,909 | 3/1970 | Weissenburger et al........ | 260/243 C |
| 3,809,699 | 5/1974 | Ishimaru......................... | 260/243 C |

*Primary Examiner*—Raymond V. Rush
*Assistant Examiner*—Jose Tovar
*Attorney, Agent, or Firm*—Curtis, Morris & Safford

[57]                ABSTRACT

Process for the manufacture of 7-amino-3-cephem-4-carboxylic acids and the esters thereof of the formula I

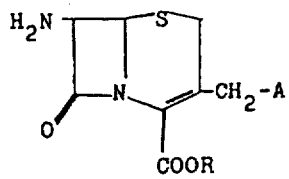

in which A stands for hydrogen, alkyl, acyloxy, alkyloxy or hydroxy and R stands for hydrogen, optionally substituted linear or branched alkyl, cycloalkyl, aryl, aralkyl, aryloxyalkyl, alkoxyalkyl, acryloxyalkyl, aroylalkyl, or a heterocyclic radical and the salts thereof which comprises reacting 7-acylamino-3-cephem-4-carboxylic acid esters of the general formula II

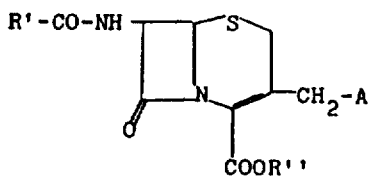

in which R' stands for optionally substituted alkyl, aryl, aralkyl, aryloxyalkyl, alkoxyalkyl or a heterocyclic radical and R'' has the meaning given for R but cannot stand for hydrogen and A is defined as above, in an inert solvent with a silylating agent in the presence of a base, converting the amido group activated by the silylation into the iminohalide by adding a halogenating agent, allowing it to react with an alcohol to yield the iminoether hydrohalide, hydrolyzing the iminoether hydrohalide and optionally splitting the 7-amino-3-cephem-4-carboxylic acid ester of the general formula I to yield the free acid, the esters obtained being valuable intermediates.

4 Claims, No Drawings

PROCESS FOR THE MANUFACTURE OF 7-AMINO-3-CEPHEM-4-CARBOXYLIC ACID DERIVATIVES

The present invention relates to a process for the manufacture of 7-amino-3-cephem-4-carboxylic acid derivatives.

It also comprises the esters and acids thereof.

It is known that 7-amino-3-cephem-4-carboxylic acids can be prepared by converting the corresponding 7-acylamino compounds into the silyl esters, treating the latter at low temperatures, for example, −40°C with phosphorus pentachloride, a base and an alcohol and subjecting them to hydrolysis. These compounds are practically insoluble in organic solvents and therefore must be reacted, in general, in an aqueous medium in the form of their salts. However, a variety of reactions can only be effected in the anhydrous medium. It was, therefore, desirable to find a process by which the esters of the 7-amino-3-cephem-4-carboxylic acids readily soluble in organic solvents are easily obtainable.

It is also known that the treatment of 7-acylamino-3-cephem-4-carboxylic acid esters with phosphorus pentachloride, a base, an alcohol and following hydrolysis leads to the corresponding amino acid esters having a free amino group. However, this known reaction does not provide - especially with respect to the yields - for satisfactory results.

Difficulties also arise with the esterification of 7-amino-3-cephem-4-carboxylic acids and so this method is not useful in practice.

It was found that 7-amino-3-cephem-4-carboxylic acids and the esters thereof corresponding to the general formula I

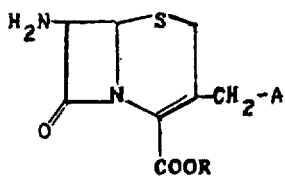

in which A stands for hydrogen, alkyl, acyloxy, alkyloxy or hydroxy and R stands for hydrogen, optionally substituted linear or branched alkyl, cycloalkyl, aryl, aralkyl, aryloxyalkyl, alkoxyalkyl, acyloxy-alkyl, aroylalkyl, or a heterocyclic radical and the salts thereof can be manufactured by reacting 7-acyl-amino-3-cephem-4-carboxylic acid esters of the general formula II

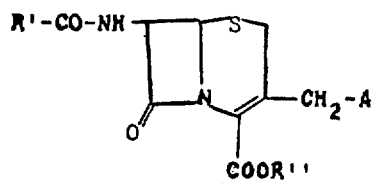

in which R′ stands for an optionally substituted alkyl, aryl, aralkyl, aryloxyalkyl, alkoxyalkyl or a heterocyclic radical and R″ has the meaning given for R but cannot stand of hydrogen and A is defined as above, in an inert solvent with a silylating agent in the presence of a base, converting the amido group activated by the silylation into the iminohalide by adding a halogenating agent, allowing the iminohalide to react with an alcohol to yield the iminoether hydrohalide, hydrolyzing the iminoether hydrohalide and optionally splitting the 7-amino-3-cephem-4-carboxylic acid ester of the general formula I so obtained to yield the free acid.

Considering the fact that the above-mentioned acyl splitting of esters led to unsatisfactory yields without effecting the silylation step in accordance with the invention, it is surprising that in the process of the invention the yield is considerably increased. It could not be expected that the silylation of the amido group in accordance with the invention would increase the reactivity of this group to such an extent that the following reaction rates could be increased to more than 90 % at low temperatures. It was also surprising that the amido group could be silylated at all in the process of the invention.

In the compounds used as starting materials R′ may stand for an optionally substituted alkyl radical, especially an alkyl radical having one to eight, preferably one to five carbon atoms, suitable substituents advantageously being an amino or carboxyl group. The optionally substituted aryl radical is, especially, a phenyl radical whtch may be substituted by halogen, preferably chlorine or bromine, low molecular alkoxy, preferably methoxy or hydroxy.

If R′ stands for an aralkyl radical it is especially the benzyl radical which can be substituted in the aromate, for example, by halogen, preferably chlorine, low molecular alkoxy or hydroxy and in the alkyl portion for example by low molecular alkyl, preferably methyl, ethyl, propyl, the amino group, halogen, preferably chlorine, the azide group, low molecular alkoxy, preferably methoxy, low molecular acyloxy, preferably acetoxy. If R′ stands for an aryloxyalkyl group this group is especially a phenyloxyalkyl radical the alkyl portion of which may represent an optionally branched low molecular alkyl group having one to five carbon atoms and the branches which may be present should have one to two carbon atoms. The aromatic portion may for example be substituted by halogen, preferably chlorine, low molecular alkoxy or hydroxy. The alkyloxyalkyl radical preferred is a low molecular radical. When using a compound of the formula II with a heterocyclic radical R′ this radical may be linked directly or by means of a low molecular alkyl or oxyalkyl group, preferably a methyl or oxymethyl group, to the carbonyl group. There may, for example be used a thienyloxymethyl group, a thienylmethyl group, a pyridylmethyl group or an isoxalyl group.

If A stands for alkyl, especially low molecular alkyl having one to five carbon atoms, preferably methyl, is used. If A stands for acyloxy, there may especially be mentioned low molecular aliphatic acyloxy having one to five carbon atoms, for example, acetoxy propionyloxy, butyryloxy, valeryloxy, if A stands for alkyloxy, especially low molecular alkyloxy having one to five carbon atoms, for example, methoxy, ethoxy, butoxy, pentoxy are used.

If R stands for linear or branched alkyl, especially alkyl having one to 10, preferably one to five carbon atoms is used, especially methyl and tertiary butyl. Suitable substitutents are for example halogen atoms, preferably chlorine and iodine. Corresponding substituents would be, for example, the 2,2,2-trichloroethyl or the 2-iodoethyl. Suitable cycloalkyl radicals are especially those having five to 10 carbon atoms, for example, cyclohexyl, especially isobornyl or adamantyl.

Suitable aryl radicals are especially phenyl, suitable aralkyl radicals are those having low molecular alkyl, for example, especially benzyl or benzhydryl which may, for example, be substituted by low molecular alkoxy or nitro groups. Example for this case are p-methoxybenzyl or p-nitrobenzyl. Suitable aryloxyalkyl and alkyloxyalkyl groups are especially those having low molecular alkyl groups, preferably, for example, phenoxymethyl or methoxymethyl. Among the acyloxyalkyl groups those having low molecular acyl and alkyl are preferred, for example, acetoxymethyl or pivaloyloxymethyl. Among the aroylalkyl groups having low molecular alkyl there may be mentioned, for example, the benzoylmethyl, a heterocyclic radical is, for example, thienyl.

The starting products of the general formula II can be prepared by various methods. Compounds in which A stands for hydrogen can be prepared by rearrangement of the penicillinsulfoxide ester in the presence of phosphonium salts or with a mixture of p-toluene sulfonic acid and N,N-dimethylacetamide in methylisobutyl ketone. For the reaction in accordance with the invention there are preferably used the p-methoxybenzyl esters which can be split under mild conditions and are especially easily accessible by reacting penicillin salts with p-methoxybenzyl chloride and oxydizing the esters obtained for example with peracids and subsequently rearranging them. The starting compounds of formula II in which A stands for acyloxy are also obtainable by various methods. For example, the di-p-methoxybenzyl ester can be obtained from cephalosporin C which is adequately protected at the amino group by reacting the di-sodium salt with p-methoxybenzyl chloride or reacting the acid with alcohols in the presence of dicyclo-hexyl carbodiimide or for example with diphenyl diazomethane to prepare the dibenzhydryl ester. The compounds of formula II in which A stands for alkoxy or hydroxy can be prepared according to known methods from the acetoxy compounds.

The esters of the general formula II are reacted, in accordance with the invention, in an inert solvent with silylating reactants in the presence of bases.

Suitable inert solvents are, for example, halogenated hydrocarbons, ethers, ketones and esters.

Suitable silylating agents are, preferably, strong silylating reactants, for example, trimethyl chlorosilane, dimethyldichlorosilane, methyltrichlorosilane, triethylchlorosilane, trimethylbromosilane, phenyltrichlorosilane, methoxytrichlorosilane, N,O-bistrimethyl-silyl-acetamide and trimethylsilyltrifluoroacetamide. The trimethyl-chlorosilane and the dimethyldichlorosilane are preferably used.

Especially high yields are obtained when working with molar amounts, especially with an excess, for example, 1.5 to 2 times the amount of silylating agent. However, less than molar amounts are also sufficient to increase the yield.

The bases used in accordance with the invention are, preferably organic bases, especially tertiary amines which may carry the same or different substituents, for example, triethyl amine, N,N-dimethyl aniline, N,N-diethyl aniline, N-methyl piperidine and N-ethyl morpholine, but also aromatic amines for example pyridine and its substitution products with inert substitutents, for example, picolines or also quinoline and the inert substituent products thereof. The N,N-dimethyl aniline is especially suitable for the process of the invention.

The bases are used in at least the equimolar amount, calculated on the silylating agent. The reaction is carried out at temperatures ranging from about 0° to about 100°C, preferably 10 to 60°C. When carrying out the reaction at room temperature which is the preferred temperature it is already completed after a short while.

The acylamino group activated by the silylation in accordance with the invention is reacted at low temperatures with halogenating agents in the presence of bases to yield the iminohalide. For this purpose, acid halides may be used, for example, phosphorus oxychloride, phosphorus pentachloride, phosphorus trichloride, thionyl chloride, phosgen or oxalyl chloride. The phosphorus pentachloride is preferred.

The conversion into the imino halide group is also carried out in an inert solvent. In order to simplify the experimental conditions it is suitable to use the same solvents as those used for the silylation reaction and to introduce the agent forming the imino halide in substance or in solution.

For this reaction too, the presence of bases is required. Suitable bases are the organic bases already mentioned, especially tertiary amines. They are advantageously the same as those used for the silylation. The base can be added in two portions, i.e., when silylating the amido group and when converting it into the imino halide. It is, however, more advantageous to add the total amount of base required for both steps already when the preceding silylation is effected.

The formation of imino halide may occur in a wide temperature range from −100° to +100°C. High yields, however, are obtained at a temperature ranging from 0° to −80°C, preferably from −30° to −50°C.

The imino halide is converted into an imino ether in known manner by adding alcohols to the reaction mixture. For this purpose, an excess of about 5 to 40 mols of alcohol per mol of imino halide is advantageously used. Suitable alcohols in this case are, especially, the inexpensive low aliphatic alcohols, for example, methanol, ethanol, isopropanol or n-butanol. To avoid undesired side reactions the alcohols used must be as anhydrous as possible and the temperatures as low as about +30° to −80°C, especially about −30° to −50°C.

Following hydrolysis of the imino ethers occurs in known manner especially by pouring the deep freezed reaction mixture into two to three times the amount of water, stirring for some time and isolating the ester formed of the general formula I.

The isolation may occur according to various methods. The ester may, for example, be separated by filtration in the form of a scarcely soluble salt formed during the reaction, for example, the hydrochloride, or the ester may be freed from such a salt by adding inorganic bases, in which case it may be separated with the organic phase and isolated directly or in the form of salts. Suitable salts for this purpose are, for example, the sulfonates, for example, p-toluene sulfonates or β-naphthaline sulfonates or salts of organic acids, for example, acetates.

The esters obtained in accordance with the invention of the general formula I are valuable intermediates. They can be used for a new acylation with moisture-sensitive carboxylic acid derivatives to yield the new 7-acylamidocephem carboxylic acid esters which can easily be split, when using the ester component suitably, into the 7-acylamidocephemic acids which acids are valuable antibiotics.

The esters of formula I obtained in accordance with the invention may also be split into the corresponding carboxylic acids. The splitting may occur by reduction, for example, hydrogenolytically as, for example, in the case of the p-nitrobenzyl ester, with zinc and acetic acid, for example, in the case of the trichloro ethyl ester, in the acid medium, for example, in the case of the tertiary butyl ester, the p-methoxybenzyl ester or the benzhydryl ester. Especially suitable are the p-methoxy-benzyl esters and the benzhydryl esters which can be converted in organic solvents into the corresponding carboxylic acids with trifluoroacetic acid in the presence of anisol. This form of splitting which is especially preferred occurs quantitatively and yields the carboxylic acids corresponding to the general formula I in a form easy to filter and which can be used without further purification for the acylation in the aqueous medium. It is especially advantageous that the carboxylic acids of the general formula I can be prepared without isolation of the esters of formula I in a procedure without isolating the intermediate from the acylamino compounds of the general formula II in very good yields and in a form easy to filter.

The following examples illustrate the invention without limiting it thereto.

EXAMPLE 1

3-methyl-7-amino-3-cephem-4-carboxylic acid-p-methoxybenzyl ester-p-toluene-sulfonate To 4.68 g of 3-methyl-7-phenoxyacetamido-3-cephem-4-carboxylic acid-p-methoxybenzyl ester in 35 ml of absolute methylene chloride there were added 2.6 ml of N,N-dimethyl aniline and 2.0 ml of trimethyl chlorosilane and the mixture was stirred at room temperature for 1 hour.

After cooling to −70°C 2.2 g of phosphorus pentachloride were added, the mixture was stirred at −40°C for 2 hours, again cooled to −70°C, 20 ml of methanol were added and that mixture was stirred at −40°C for 2 hours.

Then, the solution was poured into 100 ml of water, stirred for half an hour, neutralized with sodium bicarbonate, the organic phase was separated, the aqueous phase was extracted again two times with methylene chloride and the combined organic phases were dried over sodium sulfate.

After filtration the solvent was eliminated in the vacuum and a solution of 3-g of p-toluenesulfonic acid hydrate in 20 ml of acetic acid ethyl ester was added to the residue.

The compound which crystallized out was suction-filtered and washed with acetic acid ethyl ester and ether, the yield was 4.9 g of 3-methyl-7-amino-3-cephem-4-carboxylic acid-p-methoxybenzyl ester-p-toluenesulfonate (97 % of the theory), in the form of colourless crystals having a melting point of 169°C (decomposition).

EXAMPLE 2

It was carried out as the preceding example 1 using dimethyl-dichlorosilane instead of trimethyl chlorosilane.

Yield: 4.4 g of 3-methyl-7-amino-3-cephem-4-carboxylic acid-p-methoxy-benzyl ester-p-toluene-sulfonate (87 % of the theory), in the form of colourless crystals having a melting point of 169°C (decomposition).

EXAMPLE 3

It was effected as the preceding example 1 using N,N-diethyl aniline instead of N,N-dimethyl aniline.

Yield: 4.3 g of 3-methyl-7-amino-3-cephem-4-carboxylic acid-p-methoxy-benzyl ester-p-toluene sulfonate (85 % of the theory) of colourless crystals having a melting point of 169°C (decomposition).

EXAMPLE 4

3-methyl-7-amino-3-cephem-4-carboxylic acid-2,2,2-trichloroethyl ester-p-toluene sulfonate When proceeding according to the method described in example 1 and using 4.80 g of 3-methyl-7-phenoxyacetamido-3-cephem-4-carboxylic acid-2,2,2-trichloroethyl ester, 4.3 g of 3-methyl-7-amino-3-cephem-4-carboxylic acid-2,2,2-trichloroethyl ester-p-toluene sulfonate (83 % of the theory) were obtained in the form of colourless crystals having a melting point of 193° to 194°C.

EXAMPLE 5

3-methyl-7-amino-3-cephem-4-carboxylic acid-p-nitrobenzyl ester a. To 4.83 g of 3-methyl-7-phenoxyacetamido-3-cephem-4-carboxylic acid-p-nitrobenzyl ester in 35 ml of absolute methylene chloride 2.6 ml of N,N-dimethyl aniline and 2.0 ml of trimethyl chlorosilane were added and the solution was stirred at room temperature for one hour. After cooling to −70°C 2.2 g of phosphorus pentachloride were added, the solution was stirred at −40°C for 2 hours, it was again cooled to −70°C, 24 ml of n-butanol were added and the solution was again stirred for 2 hours at −40°C.

Then, the solution was poured into 100 ml of water whereupon the hydrochloride was separated by crystallization.

The product was suction-filtered and washed with acetone. Yield: 2.8 g of 3-methyl-7-amino-3-cephem-4-carboxylic acid-p-nitro-benzyl ester-hydrochloride (73 % of the theory) of colourless crystals having a melting point of 189°C.

The mother lye was neutralized with NaHCO$_3$, the organic phase was separated, the aqueous phase was again extracted twice with methylene chloride and the combined organic phases were dried over sodium sulfate. After filtration the solvent was eliminated in the vacuum and 1 g of p-toluene sulfonic acid in 10 ml of acetic acid ethyl ester was added to the residue, whereupon a further 0.73 g (14 % of the theory) of 3-methyl-7-amino-3-cephem-4-carboxylic acid-p-nitrobenzyl-ester-p-toluenesulfonate precipitated in the form of colourless crystals having a melting point of 174 to 175°C (decomposition). The total yield was 87 % of the theory.

b. When working according to the method described in Example 5a) and using 4.67 g of 3-methyl-7-phenylacetamido-3-cephem-4-carboxylic acid-p-nitrobenzyl ester, 2.7 g (70 % of the theory) of 3-methyl-7-amino-3-cephem-4-carboxylic acid-p-nitro-benzylester-hydrochloride having a melting point of 192°C (decomposition) were obtained.

As described in Example 5a) the further product which precipitated from the mother lye was tosylated in a yield of 0.85 g (16 % of the theory) and having a melting point of 174° to 175°C (decomposition). (Total yield: 86 % of the theory).

c. 5.0 g of 3-methyl-7-amino-3-cephem-4-carboxylic acid-p-nitrobenzyl ester-hydrochloride were dissolved hot in 50 ml of methanol and 25 of water, filtered and mixed with a sodium bicarbonate solution whereupon the free base immediately separated as crystals. It was suction-filtered and washed with water, methanol and ether. Yield: 4.3 g of 3-methyl-7-amino-3-cephem-4-carboxylic acid-p-nitro-benzyl ester (95 % of the theory), of colourless crystals having a melting point of 181° to 182°C.

EXAMPLE 6

3-methyl-7-amino-3-cephem-4-carboxylic acid-benzhydryl ester

In a manner analogous to that described in Example 1 there could be obtained from 3-methyl-7-phenoxyacetamido-3-cephem-4-carboxylic acid-benzyhydryl ester after condensing the combined organic phases and adding petrol ether 7.2 g of 3-methyl-7-amino-3-cephem-4-carboxylic acid-benzhydryl ester (95 % of the theory) having a melting point of 150° to 152°C.

To be purified the product was dissolved in acetic acid ethyl ester and with a solution of β-naphthaline sulfonic acid in acetic acid ethyl ester the β-naphthaline sulfonate precipitated in the form of colourless crystals having a melting point of 165° to 166°C.

When dissolving that sulfonate in methanol and adding an aqueous solution of sodium bicarbonate, pure 3-methyl-7-amino-3-cephem-4-carboxylic acid benzhydryl ester having a melting point of 154° to 155°C precipitated.

EXAMPLE 7

7-amino-cephalosporanic acid-p-methoxybenzyl ester-p-toluene sulfonate

In a manner analogous to that described in Example 1 there were obtained from 3.0 g of 7-(thienyl-2-acetamido)cephalo-sporanic acid-p-methoxybenzyl ester (melting point: 150° to 151°C) 2.4 g of 7-amino-cephalosporanic acid-p-methoxybenzyl ester-p-toluene-sulfonate (73 % of the theory) in the form of colourless crystals having a melting point of 148° to 149°C (decomposition).

EXAMPLE 8

3-methyl-7-amino-3-cephem-4-carboxylic acid a. To a suspension of 500 g of 3-methyl-7-amino-3-cephem-4-carboxylic acid-p-methoxy-benzyl ester-p-toluene-sulfonate in 400 ml of anisol and 400 ml of benzene there were added dropwise 400 ml of trifluoroacetic acid while stirring. The reaction mixture was heated to about 35°C whereupon a clear solution was obtained.

The mixture was stirred for another hour at room temperature, cooled with ice and a mixture of 880 ml of triethyl amine in 900 ml of benzene was added at 0° to 10°C. After about 30 minutes at 0°C the 3-methyl-7-amino-3-cephem-4-carboxylic acid was suction-filtered and washed with benzene and ether. Yield: 200 g (95 % of the theory) of colourless crystals.

To be purified the product was dissolved in an aqueous sodium bicarbonate solution, the solution was filtered with active charcoal and acidified with hydrochloric acid to a pH of 3.8 whereupon the 3-methyl-7-amino-3-cephem-4-carboxylic acid separated as crystals. It was suction-filtered, washed with water, acetone and ether. Yield: 193 g (92 % of the theory) of 3-methyl-7-amino-3-cephem-4-carboxylic acid.

b. To 4.68 g of 3-methyl-7-phenoxyacetamido-3-cephem-4-carboxylic acid-p-methoxybenzyl ester in 35 ml of methylene chloride there were added 2.6 ml of N,N-dimethyl aniline and 2.0 ml of trimethyl chlorosilane and the mixture was stirred for 1 hour at room temperature. After cooling to −70°C 2.2 g of phosphorus pentachloride were added, the mixture was stirred at −40°C for 2 hours, again cooled to −70°C, 20 ml of methanol were added and the mixture was stirred again at −70°C for 2 hours. Then, the solution was poured into 100 ml of water, stirred for half an hour, neutralized with sodium bicarbonate, the organic phase was separated, the aqueous phase was again extracted twice with methylene chloride and the combined organic phases were dried over sodium sulfate. After filtration the solvent and the N,N-dimethyl aniline were eliminated in the vacuum (at last at about 0.1 torr) and the residue was dissolved in 8 ml of anisol and 8 ml of benzene. 10 ml of trifluoroacetic acid were added dropwise. to the reaction solution and that solution was stirred for another hour at room temperature. It was then cooled with ice and at 0° to 10°C 18.5 ml of triethyl amine in 18 ml of benzene were added dropwise. The 3-methyl-7-amino-3-cephem-4-carboxylic acid which separated as crystals was suction-filtered and thoroughly washed with benzene and ether. Yield: 3.8 g (89 % of the theory).

EXAMPLE 9

3-methyl-)-amino-3-cephem-4-carboxylic acid-methylester-p-toluene sulfonate

According to the method described in Example 1 there were obtained from 14.5 g of 3-methyl-7-phenoxyacetamido-3-cephem-4-carboxylic acid methyl ester 11.6 g (73 % of the theory) of the compound of the invention in the form of colourless crystals having a melting point of 178°C.

EXAMPLE 10

3-methyl-7-amino-3-cephem-4-carboxylic acid-methoxymethyl ester-p-toluene sulfonate According to the method described in Example 1 there were obtained from 5.0 g of 3-methyl-7-phenoxyacetamido-3-cephem-4-carboxylic acid-methoxymethyl ester (melting point: 103° − 104°C) 3.5 g (64 % of the theory) of the compound of the invention in the form of colourless crystals having a melting point of 143° − 144°C.

EXAMPLE 11

3-methyl-7-amino-3-cephem-4-carboxylic acid-3-phthalide ester

According to the method described in Example 1 there were obtained from 8.8 g of 3-methyl-7-phenoxyacetamido-3-cephem-4-carboxylic acid-3-phthalide ester after separating the methylene chloride by distillation and recrystallization of the residue from acetic acid ethy ester, 4.5 g (71 % of the theory) of the compound of the invention in the form of colourless crystals having a melting point of 169° − 170°C.

EXAMPLE 12

3-methyl-7-amino-3-cephem-4-carboxylic acid-pivaloyloxymethyl ester-hydrochloride According to the method described in Example 1 there were obtained from 62.3 g of 3-methyl-7-phenoxyacetamido-3-cephem-4-carboxylic acid-pivaloyloxymethyl ester after separating the methylene chloride by distillation and adding acetic acid ethyl ester and a little hydrochloric acid, 30.6 g (62 % of the theory) of the compound of the invention. The colourless crystals were recrystallized from methanol/ether and melted at 170°C.

We claim:

1. In a method for making a 7-amino-3-cephem-4-carboxylic acid or an ester thereof of the formula I

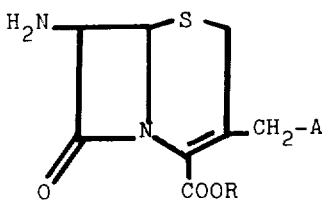

in which A stands for hydrogen, alkyl, acyloxy, alkyloxy or hydroxy and R stands of hydrogen, linear or branched alkyl, alkyl substituted by halogen, cycloalkyl, aryl, aralkyl, aralkyl substituted by lower alkoxy or nitro, aryloxyalkyl, alkoxyalkyl, acyloxyalkyl, aroylalkyl or thienyl, and the salts thereof, from an acylamino compound of a formula II

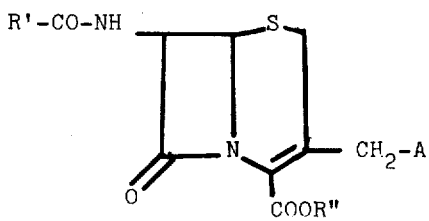

in which R' stands for alkyl, alkyl substituted by amino or carboxyl, aryl, aryl substituted by halogen or lower alkoxy or hydroxy, aralkyl, aralkyl substituted in the aromate by halogen or lower alkoxy or hydroxy, aralkyl substituted in the alkyl portion by lower alkyl or amino or halogen or lower alkoxy or lower acyloxy or the azido group, aryloxy alkyl, aryloxyalkyl substituted in the aromate by halogen or lower alkoxy or hydroxy, alkoxyalkyl and thienyloxymethyl, thienylmethyl, pyridylmethyl or isoxalyl and R'' has the meaning given for R but cannot stand for hydrogen and A is defined as above, by reacting compound II with an acid halide to form the corresponding iminohalide, converting the iminohalide into the corresponding iminoether by reaction with an alcohol, and hydrolyzing the resulting iminoether, the improvement wherein the compound of the formula II is reacted in an inert solvent with a silylating agent wherein the silylation agent used is trimethyl chlorosilane, dimethyl dichlorosilane, methyltrichlorosilane, triethyl chlorosilane, trimethyl bromosilane, N,O-bistrimethyl silyl acetamide or trimethylsilyl trifluoroacetamide in the presence of a base to activate the amido group before its reaction with the acid halide.

2. The process as defined in claim 1 and wherein after hydrolyzing the resulting iminoether, the 7-amino-3-cephem-4-carboxylic acid ester of the formula I is split to yield the free acid.

3. The process as defined in claim 1, wherein the silylation reaction is carried out at a temperature ranging from 0° to 100°C.

4. The process as defined in claim 1, wherein the silylation reaction is carried out at a temperature ranging from +10 to +60°C.

* * * * *